No. 848,704. PATENTED APR. 2, 1907.
W. THOMSON, R. BLAKISTON, W. HOPE & G. B. RICHARDS.
LIQUID METER.
APPLICATION FILED APR. 16, 1906.
3 SHEETS—SHEET 2.
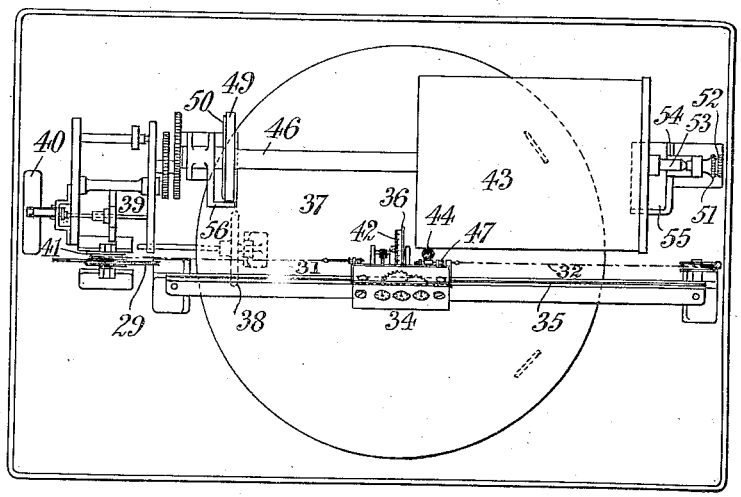
Fig. 5
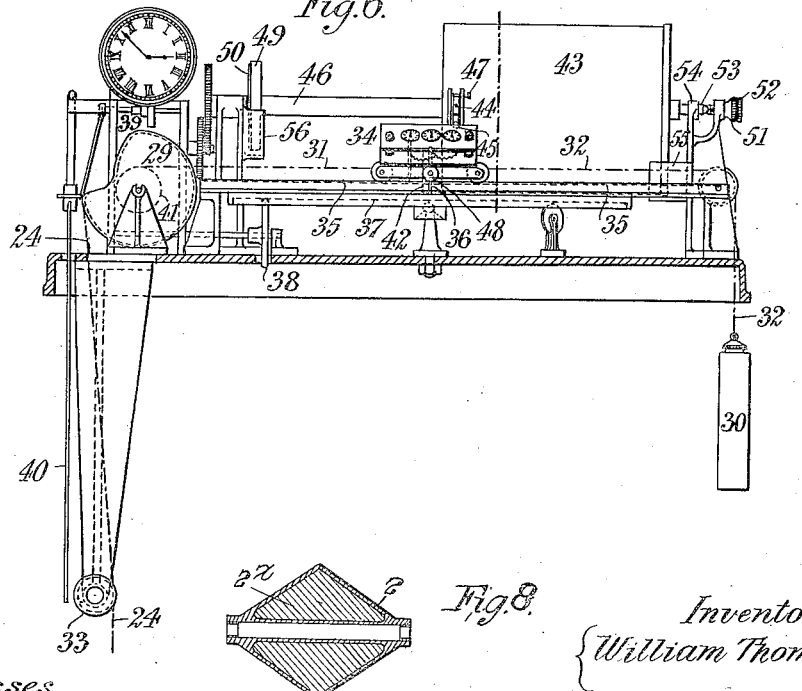
Fig. 6.
Fig. 8.
Witnesses
Paul J. Gathmann
E. B. Burr
Inventors:
William Thomson
Ralph Blakiston, William Hope,
George B. Richards.
By their Attorneys:
Baldwin Wight No. 848,704. PATENTED APR. 2, 1907.
W. THOMSON, R. BLAKISTON, W. HOPE & G. B. RICHARDS.
LIQUID METER.
APPLICATION FILED APR. 16, 1906.
3 SHEETS—SHEET 3.
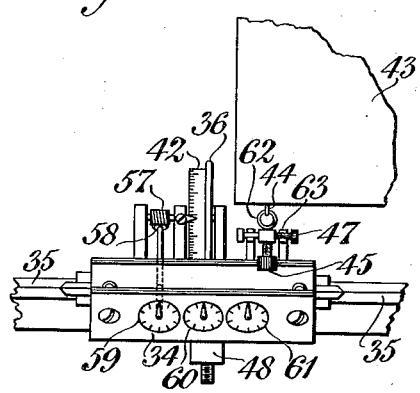
Fig. 7.ˣ
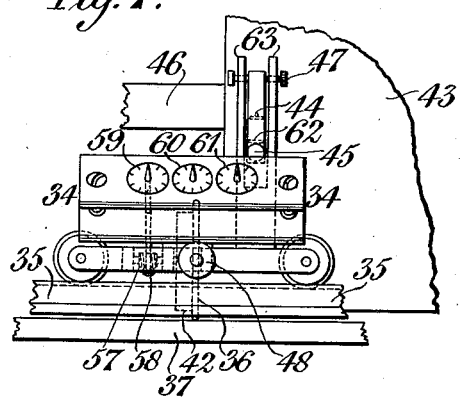
Fig. 7.ˣˣ
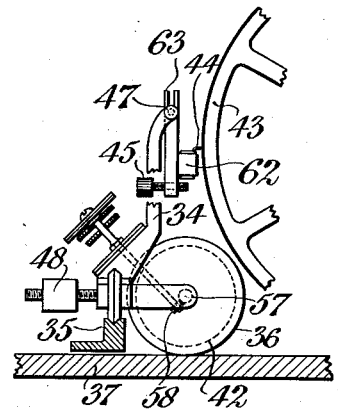
Fig. 7.
Witnesses.
M. Lilian Adams.
C. F. Early.
Inventors.
Wm. Thomson
Ralph Blakiston
Wm. Hope
Geo. B. Richards
by their Attorneys,
Baldwin Wight.

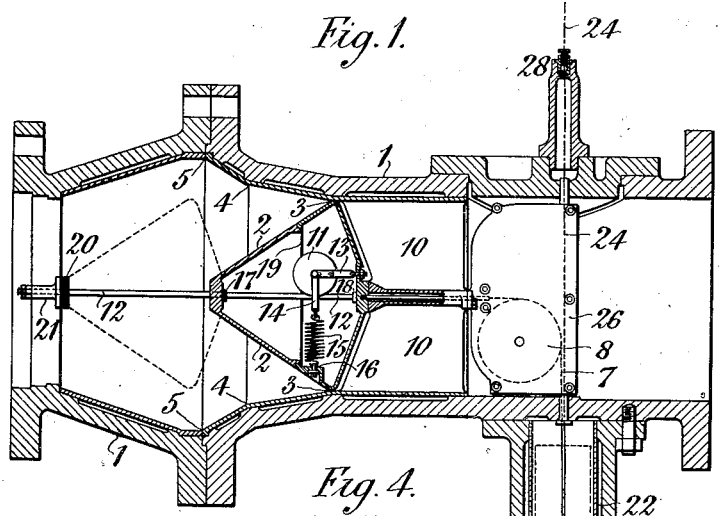
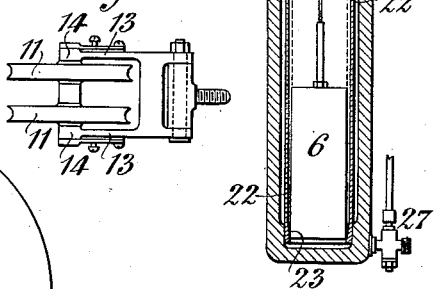
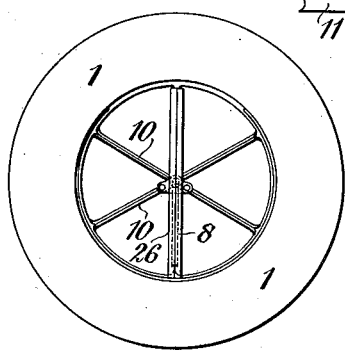
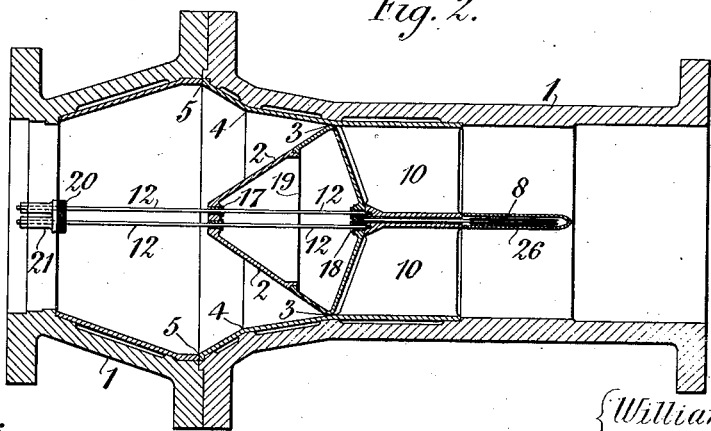

UNITED STATES PATENT OFFICE.

WILLIAM THOMSON, OF LARGS, SCOTLAND, AND RALPH BLAKISTON, WILLIAM HOPE, AND GEORGE BEAUFORT RICHARDS, OF LIVERPOOL, ENGLAND, ASSIGNORS TO THE PALATINE ENGINEERING COMPANY, LIMITED, OF LIVERPOOL, ENGLAND.

LIQUID-METER.

No. 848,704.　　　Specification of Letters Patent.　　　Patented April 2, 1907.

Application filed April 16, 1906. Serial No. 312,015.

*To all whom it may concern:*

Be it known that we, WILLIAM THOMSON, (Baron KELVIN,) residing at Largs, in the county of Ayr, Scotland, and RALPH BLAKISTON, WILLIAM HOPE, and GEORGE BEAUFORT RICHARDS, engineers, of the Palatine Engineering Company, Limited, residing at 10 Blackstock street, Liverpool, England, subjects of the King of Great Britain, have invented certain new and useful Improvements in Liquid-Meters, of which the following is a specification.

This invention relates to liquid-meters of the class in which the flow of liquid is measured by the movement of a disk or other body (which in this specification will be termed "impact members") in a tapered pipe against the resistance of a weight or spring. The well-known "Deacon" meter is a good example of the type. Such meters have hitherto generally been vertical; but this is very inconvenient for large or shallow mains, besides having the disadvantage that the direction of the whole of the water passing through the meter must be changed from horizontal to vertical and then back again to horizontal.

This invention has for its object to provide means whereby such meters can be made to work horizontally and to provide certain details of construction which are applicable also to vertical meters.

According to this invention the weight of the impact member is counterbalanced internally, so that it moves on its guide with a minimum of friction. This can be done either by making the impact member of the same specific gravity as the liquid, or preferably in the manner hereinafter described. In order also to present the formation of eddies in the liquid, the impact member is made in the form of a double cone. It is important that the form and construction of the impact member should be such that its center of gravity and center of buoyancy should be in the same vertical line.

Figure 1 is a vertical section, and Fig. 2 a horizontal section, of the lower part of a meter constructed according to this invention. Fig. 3 is a part rear elevation, and Fig. 4 is a plan, of a detail to a larger scale. Fig. 5 is a plan, and Fig. 6 an elevation, of the upper part of the meter. Figs. 7, $7^\times$, and $7^{\times\times}$ are a local side elevation, plan, and front elevation, to a larger scale, of the recording mechanism. Fig. 8 is a longitudinal section of a modified form of impact member.

1 is the body of the meter, and 2 is the impact member in its zero position, in which its greatest diameter fills the smaller end 3 of the tapered waterway, hereinafter called the "cone."

4 is the wide end of the cone proper, and 5 is the end of a trumpet-mouthed extension.

6 is the counterbalance-weight to resist the movement of the impact member. It is connected to it by the cord 7, passing over the pulley 8. When a maximum flow occurs, the impact member takes the extreme position. (Shown by dotted lines.) In this position the impact member is beyond the cone proper. All ordinary and usual quantities of water are gaged between the impact member and the cone proper, 3 4, while all extraordinary and unusual quantities, such as result from fires or burst pipes, are gaged between the impact member and the trumpet-mouthed extension 4 5 thereof.

Guide blades or vanes, with sharp edges fixed in the waterway, are shown at 10.

The coned faces of the impact member have two objects, the first being a reduction of fluid-friction by diminution of eddies, the second being the provision of a hollow form which may be floated or otherwise supported with but little friction while moving in the waterway.

The impact member is supported on a pair of wheels 11, running on horizontal rods 12. The position of the axis of the wheels is maintained in the vertical line passing through the center of gravity of the impact member by means of the horizontal forked arm 13, Fig. 4, one end of which is hinged to the impact member and the fork of which forms the wheel-bearing and carries the vertical cheeks 14. Upon these wheels the impact member is supported by the hanging cheeks 14 and the spring 15. The connection between the spring and impact member is provided with an adjusting-screw 16, by means of which the tension on the spring and consequent load on the wheel may be made precisely equal to the weight of the impact member in water. In this condition the guiding of the impact member by means of the horizontal bars is as frictionless as if the impact member were actually floating, with its center of buoyancy in the vertical line of the center of gravity, and the only additional friction is the very small amount due to the rolling of the wheels.

We find that glass is probably the best material for bushing the ends of the impact member at 17 and 18; but vulcanite and lignum-vitæ also answer well.

This apparatus being within the impact member is protected from contact with the moving water and is therefore not affected by impurities in the water tending to produce electrolytic action or oxidation or physical coating of the parts. It is important that such apparatus should not be placed in the running stream and that frequent change of the water around it should be prevented.

Access is obtained to the interior of the impact member by separating the parts at the joint 19.

We have pointed out the importance of avoiding the eddies due to the flat sides of the impact member, and it is important to notice that such eddies are also set up by any unsymmetrical distribution of the velocities in a cross-section of the meter, such as would be produced by eccentricity of the disk and waterway or by the use of such a device as a flap-valve instead of an object of circular section free to move concentrically in the circular section of a tapered waterway.

In order to prevent shock caused by sudden opening of a valve or the bursting of a pipe, a flexible washer or spring 20 is provided, acting as a buffer between the impact member and the stop 21. Similarly, shock due to sudden closing is prevented by making the lower end or the whole of the vessel 22 in which the counterbalance-weight 6 rises and falls of very little larger diameter than the counterbalance-weight, so that the fall of the counterbalance-weight is retarded. A contraction for this purpose is shown at 23.

The mechanical means as above described for counterbalancing the weight and buoyancy of the impact member and thus preventing friction may be replaced by other means so long as they are inside and not outside the impact member. Thus, as shown at Fig. 8, the impact member 2 may have a filling $2^x$ of gutta-percha, india-rubber, or other sensibly incompressible substance insoluble in water and having a density less than unity, which may, in conjunction with the framework or casing of the impact member, be made equal in mean density to that of the water displaced. Care must of course be taken, as in the case of the wheel and spring suspension, that the center of buoyancy shall be in the same vertical line as the center of gravity of the combined mass.

24, Figs. 1 and 6, is a wire connecting the counterbalance-weight 6 to the recording and integrating mechanism.

The pulley 8 is, as shown at Figs. 2 and 3, contained in a casing 26 very little thicker than the guide-vanes 10 and forming a rearward prolongation of one of them, so that it forms a very slight impediment in the waterway and does not interfere with the symmetrical flow of the water. The interior of the casing 26 is in direct communication with the counterbalance-casing 22. Thus the gearing between the impact member and the counterbalance-weight and recording mechanism is, like the gear within the impact member, protected from the effect, already referred to, of impurities in the water tending to produce electrolytic action or oxidation or physical coating of the parts. It is desirable to provide means for flushing out the casing in which the whole of this gear is contained, and this may be done by means of the cock 27, which may discharge to waste.

The wire 24 passes out through a stuffing-box 28 and over the helical spiral or helicoid 29 and is kept taut by the counterbalance-weight 30 acting through the cords 31 32. The figure of the helicoid is such that any angular movement thereof is in all positions proportional to the difference between the volume of water passing the impact member per unit of time at the beginning and end of that movement. Thus equal angular movements correspond with equal changes in the rate of flow through the meter.

The wire 24 may itself be carried round the helicoid 29 or may be connected with a more flexible cord for that purpose, such as a strand-wire or a fine ribbon or a chain. In order to maintain the line of the wire outside the stuffing-box approximately in the axis of the stuffing-box, it is caused to pass over a guide-pulley 33.

Between the cords 31 and 32 is interposed a trolley or carriage 34, running with two pulleys or rollers on a rail 35, the third support of which trolley is the integrating-wheel 36, having a sliding motion in the direction of its axis over a radius of the time-disk 37, driven at a constant speed by the friction-wheel 38 and clockwork 39 with its pendulum 40. The integrating-wheel 36 is shown resting upon the center of the time-disk 37, this being the zero position corresponding with the position of the impact member when no flow of water is taking place. The horizontal cord passes over a pulley 41, fixed upon and concentric with the helicoid 29, and the angular movements of the helicoid and concentric pulley and the horizontal travel of the cord from their zero positions are in virtue of the figure of the helicoid rendered proportional to the rate of flow of water through the meter.

In the particular meter illustrated each revolution of the integrating-wheel 36 represents one hundred thousand gallons, fractions of which quantity are engraved on a drum 42, projecting from the wheel. The axle of the wheel carries a worm 57, which by means of a pinion 58 drives a hand revolving on a counter-face 59, recording one million gallons for each revolution. A second counter-face 60 records ten million, and a third, 61, one hundred million gallons. The same trolley carries a marker, shown in the drawings to consist of a little vessel 62 to contain anilin dye, which passes to the drum 43 through a capillary siphon-tube 44, the anilin vessel being freely hung on a pivot 47 from a forked pedestal 63 on the trolley in such a manner that the center of gravity of the hanging portion may be changed by the adjustment of the weighted screw at 45, so as to produce the slightest possible pressure against the revolving drum or diagram paper. The drum 43 is fixed upon a spindle 46. The marker may be adjusted to the zero of the diagram by the milled head and pivot-screw 47 independently of the zero of the integrating-wheel, which is adjusted by a screw upon the trolley at 48. The clockwork end 46 of the drum-spindle has fixed to it a short hollow truncated cone at 49, forming a friction-coupling with the coned disk 50, driven by the clockwork 39. The spindle 46 also serves as a handle for the convenient removal of the drum on loosening the clamping-screw 51 and turning the milled head 52. The end 53 of the spindle may then be lifted from the forked bearing 54. Guards are provided at 55 and 56 to prevent the drum when being placed in position from striking the disk or the trolley. These guards insure the proper engagement of the friction-coupling when the drum is placed in position by hand and when pushed toward the coupling 49 50 by turning the screw milled head 52.

What we claim is—

1. In a liquid-meter, the combination of a horizontal tapered pipe, and an impact member mounted to move in the tapered portion of the pipe and having two coned faces and its center of gravity and its center of buoyancy in the same vertical line.

2. In a liquid-meter, the combination of a tapered pipe, an impact member in the pipe, and means inside the shell of the impact member for counterbalancing the difference between its weight and buoyancy.

3. In a liquid-meter, the combination of a tapered pipe, an impact member having two coned faces in the pipe, and a guide passing through the impact member and on which it moves.

4. In a liquid-meter, the combination of a horizontal tapered pipe, an impact member in the pipe having its center of gravity and its center of buoyancy in the same vertical line, and a guide passing through the impact member and on which it moves.

5. In a liquid-meter, the combination of a tapered pipe, an impact member in the pipe, means inside the shell of the impact member for counterbalancing the difference between its weight and buoyancy, and a guide passing through the impact member.

6. In a liquid-meter, the combination of a horizontal tapered pipe, a hollow impact member in the pipe, a guide passing through the impact member, an arm pivoted inside the impact member, a roller carried by the arm and bearing on the guide, and a spring fixed in the impact member tending to force the roller against the guide.

7. In a liquid-meter, the combination of a horizontal tapered pipe, an impact member having two coned faces mounted to move in the tapered portion of the pipe, a counterbalance-weight tending to pull the impact member toward the narrower portion of the pipe, a vessel containing it, a line connecting the impact member to the counterbalance-weight, and a pulley over which the line passes.

8. In a liquid-meter, the combination of a horizontal tapered pipe, an impact member in the pipe having its center of gravity and its center of buoyancy in the same vertical line, a counterbalance-weight, a vessel containing it and in which it fits closely, a line connecting the impact member to the counterbalance-weight, and a pulley over which the line passes.

9. In a liquid-meter, the combination of a tapered pipe, an impact member in the pipe, means inside the shell of the impact member for counterbalancing the difference between its weight and buoyancy, a counterbalance-weight, a vessel containing it, a line connecting the impact member to the counterbalance-weight, and a pulley over which the line passes.

10. In a liquid-meter, the combination of a tapered pipe, an impact member having two coned faces in the pipe, a guide passing through the impact member and on which it moves, a counterbalance-weight, a vessel containing it, a line connecting the impact member to the counterbalance-weight, and a pulley over which the line passes.

11. In a liquid-meter, the combination of a horizontal tapered pipe, an impact member in the pipe having its center of gravity and its center of buoyancy in the same vertical line, a guide passing through the impact member, a counterbalance-weight, a vessel containing it and in which it fits closely, a line connecting the impact member to the counterbalance-weight, and a pulley over which the line passes.

12. In a liquid-meter, the combination of a tapered pipe, an impact member in the pipe, means inside the shell of the impact member for counterbalancing the difference between its weight and buoyancy, a guide passing through the impact member, a counterbalance-weight, a vessel containing it, a line connecting the impact member to the counterbalance-weight, and a pulley over which the line passes.

13. In a liquid-meter, the combination of a horizontal tapered pipe, a hollow impact member in the pipe, a guide passing through the impact member, an arm pivoted inside the impact member, a roller carried by the arm and bearing on the guide, a spring fixed in the impact member tending to force the roller against the guide, a counterbalance-weight, a vessel containing it, a line connecting the impact member to the counterbalance-weight, and a pulley over which the line passes.

14. In a liquid-meter, the combination of a horizontal tapered pipe, an impact member having two coned faces mounted to move in the tapered portion of the pipe, a counterbalance-weight tending to pull the impact member toward the narrower portion of the pipe, a closed vessel containing it, an indicating apparatus, a pair of lines connecting the counterbalance-weight to the impact member and to the indicating apparatus respectively, a pulley over which the first line passes, and a closed casing containing the pulley and the lines.

15. In a liquid-meter, the combination of a horizontal tapered pipe, an impact member in the pipe having its center of gravity and its center of buoyancy in the same vertical line, a counterbalance-weight, a closed vessel containing it, an indicating apparatus, a pair of lines connecting the counterbalance-weight to the impact member and to the indicating apparatus respectively, a pulley in the pipe over which the first line passes, and a closed casing containing the pulley and the lines.

16. In a liquid-meter, the combination of a tapered pipe, an impact member in the pipe, means inside the shell of the impact member for counterbalancing the difference between its weight and buoyancy, a counterbalance-weight, a closed vessel containing it, an indicating apparatus, a pair of lines connecting the counterbalance-weight to the impact member and to the indicating apparatus respectively, a pulley over which the first line passes, and a closed casing containing the pulley and the lines.

17. In a liquid-meter, the combination of a horizontal tapered pipe, an impact member having two coned faces mounted to move in the tapered portion of the pipe, a guide passing through the impact member, a counterbalance-weight tending to pull the impact member toward the narrower portion of the pipe, a closed vessel containing it, an indicating apparatus, a pair of lines connecting the counterbalance-weight to the impact member and to the indicating apparatus respectively, a pulley over which the first line passes, and a closed casing containing the pulley and the lines.

18. In a liquid-meter, the combination of a horizontal tapered pipe, an impact member in the pipe having its center of gravity and its center of buoyancy in the same vertical line, a guide passing through the impact member and on which it moves, a counterbalance-weight, a closed vessel containing it, an indicating apparatus, a pair of lines connecting the counterbalance-weight to the impact member and to the indicating apparatus respectively, a pulley over which the first line passes, and a closed casing containing the pulley and the lines.

19. In a liquid-meter, the combination of a tapered pipe, an impact member in the pipe, means inside the shell of the impact member for counterbalancing the difference between its weight and buoyancy, a guide passing through the impact member, a counterbalance-weight, a closed vessel containing it, an indicating apparatus, a pair of lines connecting the counterbalance-weight to the impact member and to the indicating apparatus respectively, a pulley over which the first line passes, and a closed casing containing the pulley and the lines.

20. In a liquid-meter, the combination of a horizontal tapered pipe, a hollow impact member in the pipe, a guide passing through the impact member, an arm pivoted inside the impact member, a roller carried by the arm and bearing on the guide, a spring fixed in the impact member tending to force the roller against the guide, a counterbalance-weight, a closed vessel containing it, an indicating apparatus, a pair of lines connecting the counterbalance-weight to the impact member and to the indicating apparatus respectively a pulley over which the first line passes, and a closed casing containing the pulley and the lines.

WILLIAM THOMSON, (BARON KELVIN.)
 RALPH BLAKISTON.
 WILLIAM HOPE.
 GEORGE BEAUFORT RICHARDS.

Witnesses to the signature of Lord Kelvin:
 MARTIN DEACON,
 GEORGE GREEN.

Witnesses to the signatures of Ralph Blakiston, William Hope, and George Beaufort Richards:
 WM. PIERCE,
 A. WATSON.